Feb. 4, 1930.   A. F. JOHNSON   1,746,194
SEPARABLE FASTENER
Filed Jan. 16, 1926
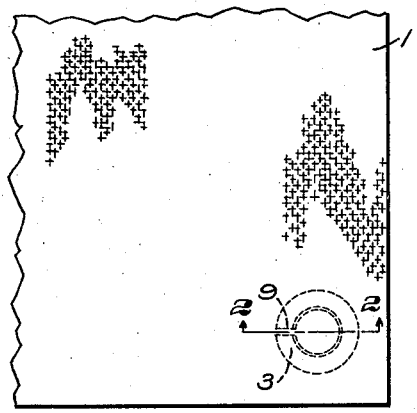
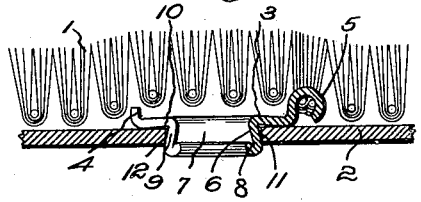
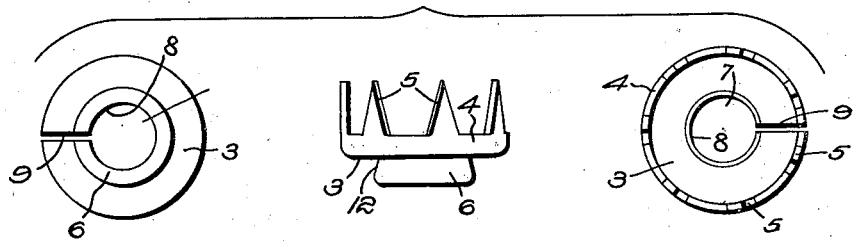
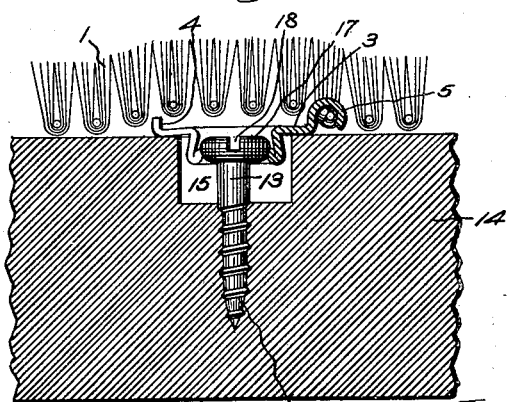
Inventor:
Alfred F. Johnson,
by Emery, Booth, Janney & Varney
Attys.

Patented Feb. 4, 1930

1,746,194

UNITED STATES PATENT OFFICE

ALFRED F. JOHNSON, OF WEST SOMERVILLE, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER

Application filed January 16, 1926. Serial No. 81,869.

This invention aims to provide improvements in separable fasteners.

In the drawings which illustrate preferred embodiments of my invention:—

Figure 1 is a plan view of a portion of a rug or carpet showing underlying fastening means in dotted lines;

Fig. 2 is a section of a carpet fastener installation taken on the line 2—2 of Fig. 1, and showing the fastener element secured to the carpet, used as a stud;

Fig. 3 includes a bottom, a side and a plan view of the fastening element which is secured to the under side of the carpet; and Fig. 4 is a cross-section of a carpet fastener installation showing the fastener element, secured to the carpet, cooperating with a stud countersunk in a hole in the floor.

Referring to the drawings, I have illustrated a separable fastener element used as either a stud or a socket in connection with securing a carpet 1, or the like, to the floor 2 of a room, automobile or the like. The element of the fastening means which is secured to the carpet 1, is simple, durable and inexpensive to manufacture, and is so constructed that it may cooperate efficiently with either a stud or a socket without effecting any changes in one use over the other.

The combination stud and socket element as illustrated in the drawings is pressed, or otherwise formed, from a single piece of metal so as to provide a base portion 3, an upstanding wall 4 at the outer periphery of the base 3, a plurality of attaching prongs 5 continuing upwardly from the wall and an annular wall 6 depressed from the central portion of the base 3 as best illustrated in Fig. 3. The wall 6 surrounds an aperture 7 through the fastener element and has a slight reversely bent portion 8 at the free end of the wall for purposes more fully hereinafter described. In order to permit the fastener element to contract and expand when engaging or disengaging a non-resilient stud or socket I have provided a slit 9 at one side thereof. This slit extends from the edge of the element to the aperture 7 and permits expansion and contraction of the element as a whole.

The above described fastener element may be best secured to the under side of the carpet 1 by forcing the prongs 5 through the web and bending them outwardly and downwardly so that they may hook over the warp and weft threads thereby metallically securing the fastener element to the carpet. The pile of the carpet conceals the attaching prongs after the attaching operation is complete.

If the floor 2 is formed of sheet metal as illustrated in Fig. 2 I prefer to provide a plain aperture 10 therethrough for cooperation with the element secured to the carpet 1.

When securing the carpet to the floor the fastener element (which in this case acts as a stud) must be brought into place so that it registers with the aperture 10 in the floor, then by applying pressure upon the carpet above the fastener element the wall 6 (which forms the head of the stud in this case) will be forced into the aperture so that the wall 11 surrounding the aperture 10 may engage the sloping neck 12 provided by the wall 6 of the fastener element as shown in Fig. 2. An important feature of securing the carpet to the floor in the above mentioned manner is the fact that the base of the fastener element may seat directly against the floor so that the carpet may not be spaced away from the floor any more than is necessary. Furthermore separation of the fastener element from the floor by lateral strain on the carpet is prevented by the close contact of the base 3 with the floor.

While the fastener element may be used to secure the carpet to a wooden floor in substantially the same manner as shown in Fig. 2, I prefer to secure a stud 13 to the wooden floor 14 as shown in Fig. 4.

The wooden floor 14 is provided with a recess 15 sufficiently large in diameter to receive the wall 6 of the fastening element. Into the recess 15 may be countersunk a suitable stud so that the head thereof is substantially flush with the upper face of the floor. The preferred form of stud as illustrated is a simple screw having a threaded shank portion 16 screwed into the floor and a flattened head 17 having a rounded periphery (Fig. 4). A slot 18 is provided in the head to receive a screw driver or other suitable tool for rotating the stud when screwing the shank of the stud into the floor. The stud may be adjusted so that the head 17 may be positioned in the proper relation with the upper face of the floor so that, when the fastener element secured to the carpet (which in this instance is used as a socket) is engaged with the stud, the base 6 will seat against the floor.

When the carpet is secured to the floor, as shown in Fig. 4, the reversely bent portion 8 provides a rounded guiding surface at the entrance of the stud receiving aperture 7 to guide the parts into engagement and it also engages back, or under, the head 17 of the stud to hold the socket in engagement therewith.

During engagement of the fastener element, secured to the carpet, with the cooperating means presented by the floor the fastener element may expand or contract as a whole even to slight movement of the attaching prongs relative to the carpet. This is possible because the flexibility of the warp and weft threads of the carpet permits movement of the prongs without effecting the attachment of the element with the carpet.

While I have shown and described preferred embodiments of my invention it will be understood that I have done so for purposes of clarification rather than limitation, the invention being best defined in the following claim.

I claim:

A separable fastener element presenting a base portion, a plurality of attaching prongs extending upwardly from the periphery of said base portion, a wall portion extending downwardly and outwardly from said base portion and surrounding a stud-receiving aperture to provide means to engage either a stud or a socket, said wall portion being spaced from the periphery of the base portion and a slit extending through one side of the base portion and the wall portion thereby to permit expansion and contraction of the fastener element as a whole.

In testimony whereof, I have signed my name to this specification.

ALFRED F. JOHNSON.